United States Patent Office 2,777,358
Patented Jan. 15, 1957

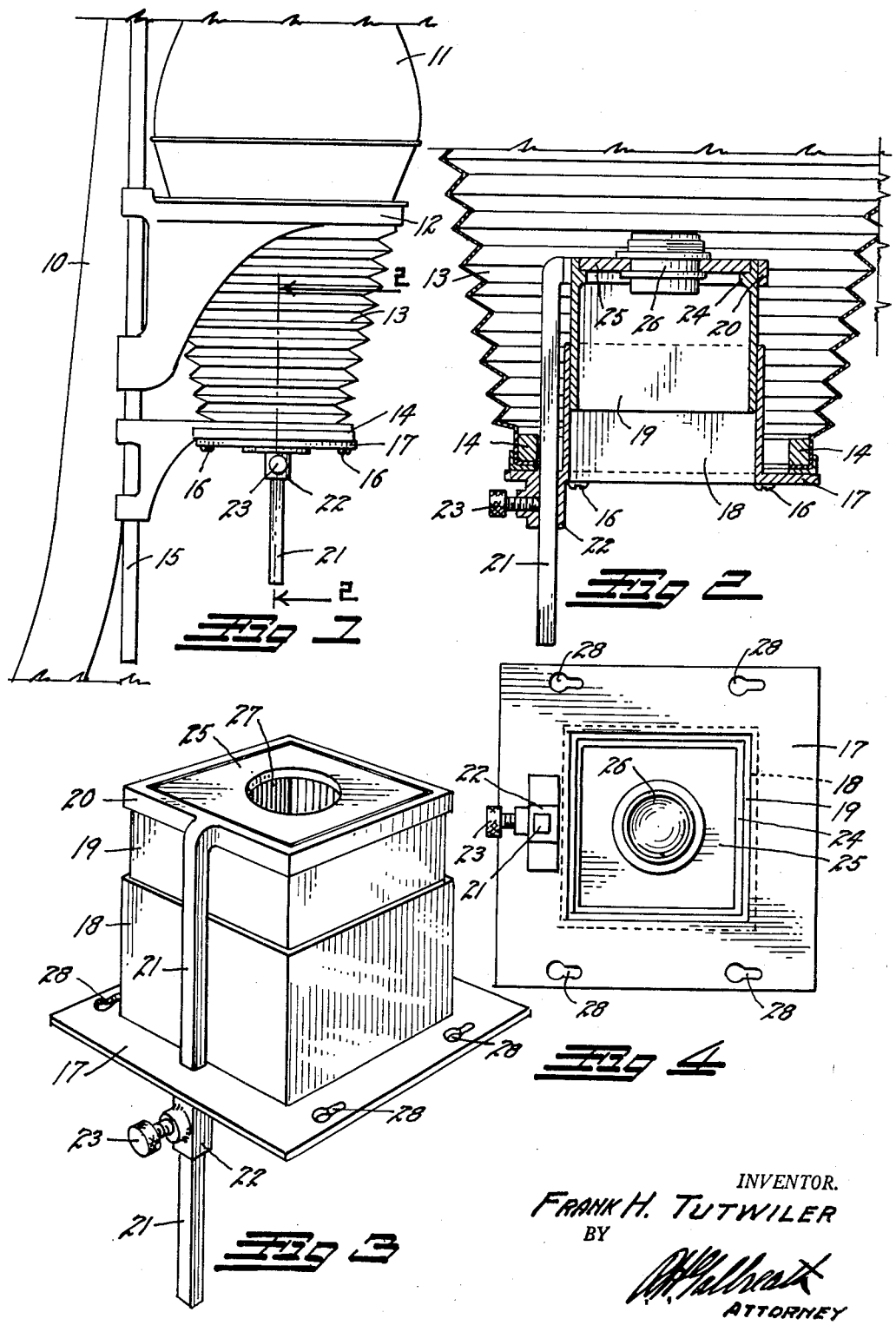

2,777,358

LENS HOLDERS FOR PHOTOGRAPHIC PROJECTOR ENLARGERS

Frank H. Tutwiler, Huntsville, Tex.

Application December 1, 1953, Serial No. 395,503

2 Claims. (Cl. 88—24)

This invention relates to a lens support for enlarging cameras, and has for its principal object the provision of an adjustable lens support which will support a lens within an enlarger bellows in a recessed position relative to the usual lens board.

The invention is more particularly designed for use with automatic focusing photographic enlargers. Enlargers of this type are designed to automatically focus the lens as the camera is moved toward or away from the enlarging table. It is impossible to place a different focusing lens in the lens board of such an enlarger due to the prefixed distance between the lens and the enlarging board.

The principal object of this invention is to provide means whereby a short-focus lens can be positioned within the bellows of an auto-focus enlarger without disturbing the position of the standard lens board of the enlarger, and to so construct the device that the lens can be quickly and easily focused from the exterior of the enlarger bellows.

The short-focus lens allows much greater enlargements to be made on a conventional auto-focus enlarger. For instance, one standard auto-focus enlarger has a maximum enlargement of four diameters. This maximum enlargement is not sufficient to make, for instance, 16″ x 20″ pictures from a 3½″ x 5″ or 4″ x 5″ negative. Since the usual negatives are of the latter sizes, many occasions arise when this standard equipment will not meet the requirements. With this improved adjustable recessed enlarger attachment, a short-focus lens, such as a 5½″ lens, may be used in place of the usual 7½″ lens ordinarily supplied with auto-focus enlargers.

A further object is to so construct the device that it can be quickly and easily positioned on or removed from the conventional enlarger lens board frame.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary side view of a conventional auto-focus enlarger camera, illustrating the invention in place thereon;

Fig. 2 is an enlarged, detail section, taken on the line 2—2, Fig. 1;

Fig. 3 is a perspective view of the improved recessed lens board attachment removed from the enlarger and with the lens removed therefrom; and Fig. 4 is a bottom view looking upwardly at the improved enlarger attachment.

For the purposes of illustration, conventional parts of a typical photographic enlarger are indicated and designated by numeral as follows: enlarging standard 10, lamp housing 11, condenser lens frame 12, bellows 13, objective lens board frame 14, and focusing slide 15.

The improved adjustable recessed enlarger attachment is designed to be attached to and below the lens board frame 14 by means of the usual attachment screws 16 which ordinarily serve to hold the conventional lens board in place thereon.

The improved attachment comprises a rectangular, open-bottomed frame 17 formed of metal plate or other suitable material and provided with a rectangular central opening. A rectangular, upstanding, open-ended outer sleeve 18 slidably receives a similar but smaller inner sleeve 19, so that the two sleeves will be in vertical telescoping relation.

The inner sleeve 19 is supported in the outer sleeve 18 from a rectangular supporting frame 20 secured to and surrounding the upper extremity of the inner sleeve 19. The supporting frame 20 is in turn supported from a vertical post 21. The post 21 is preferably, but not necessarily, square or non circular in cross section and passes downwardly through the plate 17 and through a guide tube 22 fixedly mounted or formed on the bottom of the plate 17. A set screw 23 is threaded into the tube 22 to lock the post 21 at any preset vertical position.

The inner sleeve 19 is formed with an internal flange 24 adjacent its upper open extremity. A lens board 25, provided with a medial lens opening 27, is fitted within the open upper extremity of the inner sleeve 19 and rests upon the flange 24 therein. The lens board is designed to support any suitable lens assembly. As illustrated on the drawing, a conventional objective lens barrel 26 is mounted in the medial opening 27 in the lens board 25.

To apply the attachment to an enlarger, it is only necessary to remove the regular lens board by loosening the screws 16. The two sleeves 18 and 19 are then passed through the opening in the lens board frame 14, and the plate 17 is secured against the bottom of the lens board frame 14 by means of the screws 16. The frame 17 is preferably provided with slotted screw holes 28 for receiving the screws 16 so that it will not be necessary to entirely remove the latter.

The lens board frame 14 is then raised or lowered to provide the desired enlargement angle, and the lens 26 is focused by sliding the post 21 upwardly or downwardly in its tube 22 and locking it in position by means of the set screw 23.

It will be noted that this attachment places the lens barrel 26 closer to the negative so that a short-focus, wide-angle lens may be used in place of the standard lens formerly mounted in the lens board frame 14.

While the sleeves 18 and 19 are preferably rectangular to correspond to the rectangular shape of the negative, they could, however, be made in any other suitable shape without changing the principle involved.

The principal feature of the invention is the provision of expanding means within the bellows of the enlarging camera, provided with means for adjusting and setting the expanding means at any desired focus. While the expanding means illustrated comprises the two telescoping sleeves 18 and 19, the sleeves could be replaced by an expanding bellows secured at its lower extremity to the plate 17 and at its upper extremity to the frame 20.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A lens-supporting attachment for application to photographic enlargers of the type having a lens board frame and an expansible bellows extending upwardly from said lens board frame, comprising: a frame plate having a medial opening therethrough; means for attaching said frame plate against said lens board frame; expansible means extending upwardly from said frame plate about the opening therein and within said bellows; lens-supporting means carried by the upper extremity of said expansible means; a post secured at its upper extremity to said lens-supporting means and extending downwardly through said frame plate; a guide tube mounted on said frame plate through which said post passes; and a set screw in said guide tube positioned to engage said post to lock the latter so as to support said lens-supporting means at any desired preset vertical position within the enclosure of said bellows.

2. A lens-supporting attachment for application to photographic enlargers of the type having a lens board frame and an expansible bellows extending from a rectangular opening in said frame, comprising: a flat, rectangular frame plate adapted to be secured to and below said lens board frame and provided with a rectangular central opening; an inner rectangular sleeve secured to said frame plate and extending upwardly therefrom about the opening therein; a similar inner rectangular sleeve slidably fitted within said outer sleeve and extending upwardly therefrom; an adjusting rod extending from said inner sleeve downwardly alongside said outer sleeve and through said frame plate to the exterior of said bellows; locking means carried by said frame plate for locking said rod in any desired vertical position to support said inner sleeve within said outer sleeve; and means for supporting a lens at the upper extremity of said second sleeve.

References Cited in the file of this patent

UNITED STATES PATENTS

| | | |
|---|---|---|
| 761,977 | Menchen | June 7, 1904 |
| 1,715,526 | Williamson | June 4, 1929 |
| 2,168,137 | Porter | Aug. 1, 1939 |
| 2,285,768 | Drucker | June 9, 1942 |
| 2,321,697 | Moulin | June 15, 1943 |
| 2,381,228 | Schmidt | Aug. 8, 1945 |
| 2,574,072 | Updegraff | Nov. 6, 1951 |